May 18, 1965 L. HELLERMAN 3,184,603

LOGIC PERFORMING DEVICE

Filed Feb. 23, 1961 2 Sheets-Sheet 1

"AND" FIG. 2a

| LINES 24 OR 28 | LINES 38 OR 41 | NODE 56 OR 58 |
|---|---|---|
| 0 | 0 | 0 |
| 0 | 1 | 0 |
| 1 | 0 | 0 |
| 1 | 1 | 1 |

"OR" FIG. 3a

| LINES 24 OR 28 | LINES 38 OR 41 | NODE 56 OR 58 |
|---|---|---|
| 0 | 0 | 0 |
| 0 | 1 | 1 |
| 1 | 0 | 1 |
| 1 | 1 | 1 |

INVENTOR
LEO HELLERMAN

BY Joseph C. Redmond Jr.

ATTORNEY

LOGIC PERFORMING DEVICE
Filed Feb. 23, 1961
2 Sheets-Sheet 2
FIG. 4
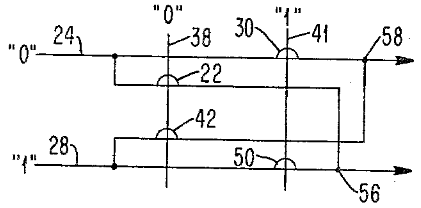
FIG. 4a
"EXCLUSIVE OR"
| LINES 24 OR 28 | LINES 38 OR 41 | NODE 56 OR 58 |
|---|---|---|
| 0 | 0 | 0 |
| 0 | 1 | 1 |
| 1 | 0 | 1 |
| 1 | 1 | 0 |
FIG. 5
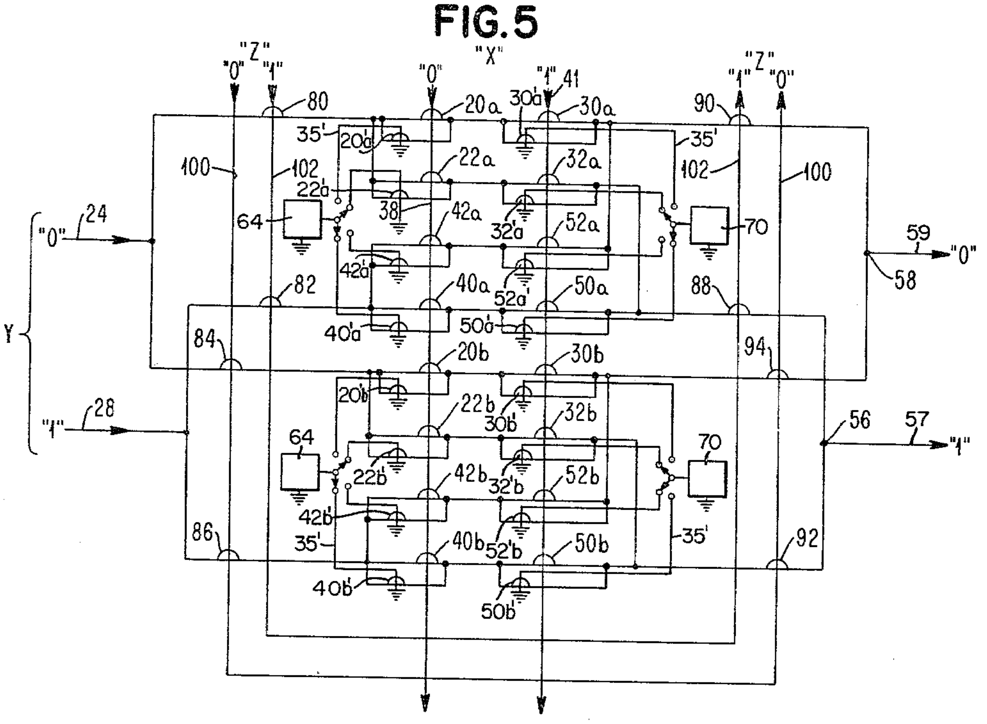
FIG. 5a
"AND"
| LINES 24 OR 28 | LINES 100 OR 102 | LINES 38 OR 41 | NODE 56 OR 58 |
|---|---|---|---|
| 0 | 0 | 0 | 0 |
| 0 | 0 | 1 | 0 |
| 1 | 0 | 0 | 0 |
| 1 | 0 | 1 | 0 |
| 0 | 1 | 0 | 0 |
| 0 | 1 | 1 | 0 |
| 1 | 1 | 0 | 0 |
| 1 | 1 | 1 | 1 |
FIG. 5b
"OR"
| LINES 24 OR 28 | LINES 100 OR 102 | LINES 38 OR 41 | NODE 56 OR 58 |
|---|---|---|---|
| 0 | 0 | 0 | 0 |
| 0 | 0 | 1 | 1 |
| 1 | 0 | 0 | 1 |
| 1 | 0 | 1 | 1 |
| 0 | 1 | 0 | 1 |
| 0 | 1 | 1 | 1 |
| 1 | 1 | 0 | 1 |
| 1 | 1 | 1 | 1 |
FIG. 5c
"EXCLUSIVE OR"
| LINES 24 OR 28 | LINES 100 OR 102 | LINES 38 OR 41 | NODE 56 OR 58 |
|---|---|---|---|
| 0 | 0 | 0 | 0 |
| 0 | 0 | 1 | 1 |
| 1 | 0 | 0 | 1 |
| 1 | 0 | 1 | 1 |
| 0 | 1 | 0 | 1 |
| 0 | 1 | 1 | 1 |
| 1 | 1 | 0 | 1 |
| 1 | 1 | 1 | 0 |

United States Patent Office 3,184,603

Patented May 18, 1965

3,184,603

LOGIC PERFORMING DEVICE

Leo Hellerman, Poughkeepsie, N.Y., assignor to International Business Machines Corporation, New York, N.Y., a corporation of New York Filed Feb. 23, 1961, Ser. No. 91,088
10 Claims. (Cl. 307—88.5)

This invention relates to logic circuits and more particularly to logic circuits adapted to perform all logic functions including, for example, the "AND," "OR" and "Exclusive OR" functions.

Digital computers and data handling equipment process information by means of electrical signals representing digital values. Circuits are employed in such equipment to control the path of the electrical signals or to generate a signal in accordance with the occurrence and concurrence of signal conditions established within the circuit. Combinations of such circuits can perform computations or manipulations in accordance with a logic system. Accordingly, such circuits are known as "logic circuits."

Large digital computers can perform a wide variety of manipulations and computations. To do this, a multitude of logic circuits are required in the computers for the particular manipulations and computations. Conventionally, each logic circuit is arranged on a supporting member, typically a printed circuit, and occupies space in the computer. As the flexibility and versatility of the computer increases, the volume of the computer grows proportionally. It is desirable, therefore, that the volume of the computer be reduced to the minimum consonant with the manipulations and computations performed by the computer.

Obviously, one method of decreasing the size of the computer is to reduce the number of logic circuits. Logic circuits adapted to provide a variety of logic functions or universal logic circuits serve this end. Universal logic circuits may exist in several forms.

In one case, a single current is supplied to the circuit and binary signals control the circuit to obtain the desired output. An example of a logic circuit that operates in this manner is shown in U.S. Patent 2,952,792 to E. F. Yhap, issued September 13, 1960, and assigned to the same assignee as that of the present invention. In another case, one of two binary input signals is available to the circuit and binary signals control the output of the circuit. The present invention is directed to a universal logic circuit of this type. Such universal logic circuits should be easily converted from one logic function to another, suitable for use with various computers and economical in cost.

A general object of the present invention is an improved universal logic circuit which controls binary input signals as contrasted with a single input current.

One object is a sturdy, easily fabricated logic package that is readily altered to perform different logic functions.

Another object is a universal logic package that can be suitably interconnected to perform binary logic for any finite number of independent variables.

These and other objects are accomplished in the present invention, one illustrative embodiment of which comprises a supporting member having at least two sets of conductive paths thereon. One conductive path of a set is connected to the corresponding conductive path of the other set through an associated interconductive path. A plurality of pairs of switching devices are arranged on the supporting member and cooperate with the conductive paths. One switching device in each pair is connected to a selected one of the conductive paths in a set. The other switching device in a set is connected to the associated interconductive path of the set. A source of binary control signals is connected to the switching device.

Means are provided for shunting one switching device in each pair of switching devices to arrange the circuit for a selected logic operation. Completing the invention is means for supplying at least one of two binary input signals to the unshunted switching devices which in response to a binary control signal, perform the logic operation established by shunting selected switching devices.

One feature of the present invention is a unique circuit configuration arranged on a supporting member, typically a glass substrate or the like, the circuit including pairs of switching points which may be selectively operated to perform a desired logic operation in response to one of two possible input signals supplied to the circuit.

Another feature is a selection circuit which controls the switchnig devices of a universal logic circuit, the selection circuit arranging the switching device to perform a selected logic operation.

Still another feature is a plurality of universal binary logic circuits and circuit means for selecting one of the binary logic circuits so that any finite number of independent binary variables can be combined in a selected logic operation.

A specific feature is a circuit configuration having a plurality of switching or control points, each control point including a pair of switching devices, one of said devices at every control point being bypassed to enable the resulting combination of bypassed switching devices to perform a desired logic operation in response to appropriate binary signals.

Another specific feature is a universal logic circuit employing superconductive paths on a supporting member and pairs of cryotrons for controlling the currents along the superconductive paths in accordance with a logical function when one of two binary input signals and one of two binary control signals are supplied to the circuit and selected cryotrons are bypassed from the circuit.

The foregoing and other objects, features and advantages of the invention will be apparent from the following more particular description of preferred embodiments of the invention, as illustrated in the accompanying drawings wherein.

Figure 1:
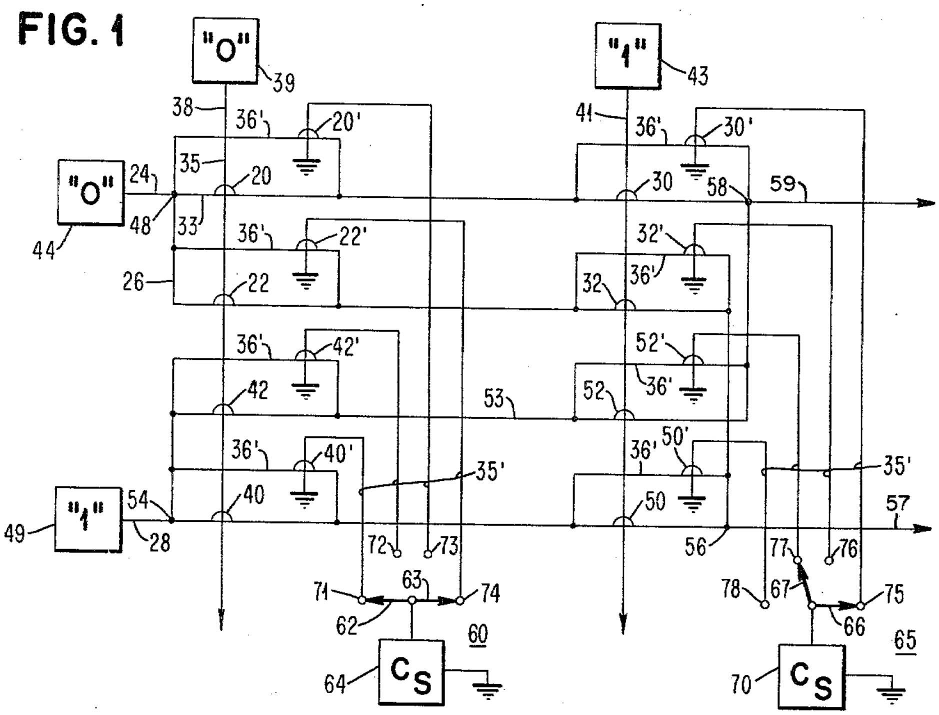
FIG. 1 is an electrical schematic of one embodiment of the novel circuitry of the present invention.
Figure 2:
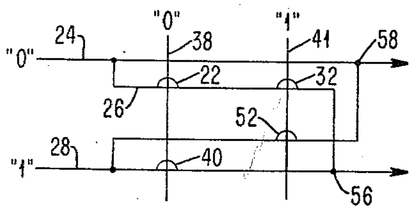
FIG. 2 is the circuit of FIG. 1 arranged as an "AND" circuit.
Figure 3:
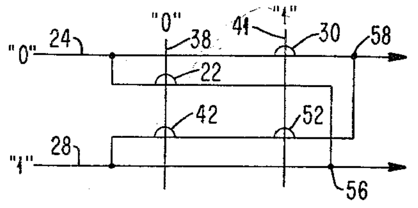

FIG. 2*a* is a tabulation of inputs and outputs for the circuit of FIG. 2;

FIG. 3 is the circuit of FIG. 1 arranged as an "OR" circuit;

FIG. 3*a* is a tabulation of inputs and outputs for the circuit of FIG. 3;

FIG. 4 is the circuit of FIG. 1 arranged as an "Exclusive OR" circuit;

FIG. 4*a* is a tabulation of inputs and outputs for the circuit of FIG. 4;

FIG. 5 is an electrical schematic of the novel circuitry of the present invention for handling three independent variables; and FIGS. 5*a*, *b* and *c* are tabulations of inputs and outputs for "AND," "OR" and "Exclusive OR" circuits respectively of the type shown in FIG. 5.

One illustrative embodiment of the present invention has application in cryogenic systems which are well known in the art being described, for example, in U.S. Patent 2,832,897 to D. A. Buck issued April 29, 1958. The cryogenic embodiment is shown in FIG. 1 wherein a plurality of thin film cryotrons 20, 22, 30, 32, 40, 42, 50 and 52 are built up on a supporting member, typically a glass substrate in the manner disclosed in U.S. application, Serial No. 625,512, filed November 30, 1956 by R. L. Garvin and assigned to the same assignee as that of the present invention. The glass substrate and cryotrons form a sturdy member for the present invention and may be readily manufactured at low cost by means of mass production techniques. All of the cryotrons on the glass substrate include a gate conductor 33 and a control conductor 35 as is well understood in the cryotron art. Since the previously mentioned cryotrons will be selectively connected together to perform various logic functions, they will be hereinafter referred to as "logic cryotrons."

The control conductors of the logic cryotrons 20, 22, 40 and 42 are connected in series to form a superconductive path or lead 38. Similarly, the control conductors of the logic cryotrons 30, 32, 50 and 52 are connected in series to form a superconductive path or lead 41, the former being connected to a source 39 of binary signals indicative of a binary "0" whereas the latter are connected to a signal source 43 indicative of a binary "1."

The gate conductors of the cryotrons 20 and 30 are connected in series to form a superconductive path or lead 24 which connects to a signal source 44 indicative of a binary "0." Similarly, the gate conductor of the cryotrons 22 and 32 are also connected in series to form a superconductive path 26 which is connected to the path 24 at a node 48. The path 26 is also connected to a superconductive path 28 at a node 56 which will be described hereinafter.

In contrast, the gate conductors of the cryotrons 40, 42, 50 and 52 are connected to a source 49 of binary signals indicative of a binary "1," the gate conductors of the cyrotrons 40 and 50 being connected in series to form the superconductive path 28 whereas the gate conductors of the cryotrons 42 and 52 are connected in series to form a superconductive path 53. The latter path is connected to the path 28 at a node 54. Also, the path 53 is connected to the path 24 at a node 58 to complete the universal logic block. Output signals from the block appear at the lines 57 and 59, binary "0" signals appearing on line 59 leaving the node 58 whereas binary "1" signals appear on line 57 leaving the node 56.

Both the binary "1" signal sources 43 and 49 and the binary "0" signal sources 39 and 44 employ a positive current to indicate the presence of the particular signal. The signal sources 44 and 49 will hereinafter be referred to as binary input signals whereas the signal sources 39 and 43 will be hereinafter be referred to as binary control signals. Normally, all signal sources are disconnected from the universal logic circuit. During operation of the computer, however, the signal sources are selectively connected to the universal logic circuit in accordance with techniques well known in the computer art, the logic circuit receiving one of the two binary input signals and employing one of the two binary controlling signals to combine the signals according to a preselected logic operation.

Also included in the supporting member are control cryotrons 20', 22', 30', 32', 40', 42', 50' and 52', each of the previously mentioned cryotrons being associated with the logic cryotron having the corresponding unprimed reference designation. Gate conductors 36' of the control cryotrons are connected in parallel with the gate conductors of the logic cryotrons associated therewith. Control conductors 35' of the control cryotron 20', 22', 24' and 26' are individually connected to different contacts of a selection switch 60, typically a rotary switch having selector arms 62 and 63. The arm 62 is limited to supplying current from a source 64 through contacts 71 and 72 to the control cryotrons 40' and 42'. Similarly, the arm 63 is limited to supplying current from the source 64 through contacts 73 and 74 to the control cryotrons 20' and 22'. Control conductors 35' of the control cryotrons 30', 32', 50' and 52' are also individually connected to different contacts of a selector switch 65 having selector arms 66 and 67 connected to a current source 70. The arms 66 and 67 are limited to supplying current to the control cryotrons 30' and 32' and 50' and 52', respectively through contacts 75 and 76 and 77 and 78, respectively.

Normally, the inductance of the path associated with the control crytron is of a lesser magnitude than the inductance of the path through the logic cryotron associated therewith. Consequently, when both the control and the logic cryotrons are superconductive, current applied to the lines 24 and 28 normally flows to the control cryotrons. These phenomena are in accordance with well known cryogenic principles as described for example in U.S. patent application Serial No. 77,777, filed December 22, 1960, and assigned to the same assignee as that of the present invention. When either the logic or control cryotron is resistive, current applied to the lines 24 or 28 is redirected to the other cryotron which remains superconductive. This feature permits logic cryotrons to be selectively added or removed from the logic circuit by applying or removing control current to the control cryotrons.

Prior to operation, the circuit of FIG. 1 is placed in a normal condition where any current on the lines 24 and 28 will be bypassed around all logic cryotrons and through the control cryotrons. This is accomplished by first disconnecting the source 44 and 49 from the lines 24 and 28 respectively, and sequentially connecting the switch arms 62, 63, 66 and 67 to the contacts associated therewith. When a switch arm engages a contact, current is supplied from the source to drive the control cryotron resistive. Current in either the control cryotron or the logic cryotron will be prevented from circulating therebetween. After sources 64 and 70 are disconnected from all lines 35', current applied to the lines 24 and 28 from the sources 44 and 49, respectively will bypass the logic cyrotron for reasons previously established.

The universal logic circuit is arranged for "AND" operation by first placing the circuit in the normal condition and thereafter applying control currents to the control cryotrons 22', 32', 40' and 52' which become resistive causing the current from the sources 44 and 49 to flow to the logic cryotrons associated therewith, the latter cryotrons being in a superconductive condition. The control currents to the control cryotrons are supplied by the sources 64 and 70 and maintained during the entire "AND" operation. Accordingly, the logic block will now appear electrically as that shown in FIG. 2. Thereafter, the currents to the lines 24 and 28 are disconnected and applied in accordance with the given input signal.

The "AND" operation of the circuit is indicated in the tabulation shown in FIG. 2*a* Assuming that signals are supplied by the sources 39 and 44 to the lines 38 and 24 respectively, it will be seen that the cryotrons 22 and 40 are driven resistive and current flows to the node 58 to indicate a binary "0" output. No current appears at the node 56 since the cryotrons 22 and 40 are resistive and prevent current flow on the paths 26 and 28 respectively. When the sources 44 and 43 are connected to the lines 24 and 41, it will be seen that the cryotrons 32 and 52 are driven resistive. Thus, again current appears at the node 58 but no current appears at the node 56 for reasons previously explained.

When signal sources 39 and 49 are connected to the lines 38 and 28 respectively, the cryotrons 22 and 40 are driven resistive which causes current to flow from the source 49 to the node 58 as in the previous case. Current appears at the node 56 when the signal sources 43 and 49 are connected to the lines 41 and 28, respectively. The cryotrons 32 and 52 are driven resistive by the current on the line 41 which enables current to flow from the source 49 to the node 56 to indicate a binary "1." Thus, the output from the circuit of FIG. 2 is identical to that of the conventional "AND" circuits.

To change the circuit of FIG. 2 to an "OR" circuit as shown in FIG. 3, the circuit is reset to the normal condition in the manner previously described. Thereafter, control current is applied to the control cryotrons 22', 30' 42' and 52' which become resistive and enable current from either the source 44 or 49 to flow through the logic cryotrons 22, 30, 42 and 52 respectively. The logic circuit now appears electrically as that shown in FIG. 3. The tabulation shown in FIG. 3*a* indicates the operation of the circuit for the various signals supplied to the leads 24, 28, 38 and 41 and corresponds to the well known "OR" circuit. The operation of the circuit described by FIG. 3*a* is similar to that described for FIG. 2 and will be omitted for reasons of brevity.

The circuit of FIG. 1 is converted to an "Exclusive OR" function as shown in FIG. 4 by resetting the circuit to the normal condition and thereafter driving the control cryotrons 22′, 30′, 42′ and 50′ resistive as previously explained. Subsequently, the logic cryotrons 22, 30, 42 and 50 become superconductive to permit the desired logic operation. The tabulation shown in FIG. 4*a* indicates the operation of the circuit for "Exclusive OR" operation.

It should be noted in connection with FIGS. 1 through 4 that a plurality of pairs of logic cryotrons control the flow of current on the lines 24 and 28 to the nodes 58 and 56 respectively. Specifically, the cryotrons 20 and 22 and the cryotrons 30 and 32 are the pairs that control the current on the line 24 to the node 58. Similarly, the cryotrons 40 and 42 and the cryotrons 50 and 52 are the pairs which control the current on the line 28 to the node 56. Conveniently, one of the logic cryotrons is shunted or bypassed to enable a particular logic operation to be performed. Thus, for the "AND" function, the cryotrons 20 and 30 in the pairs associated with the lead 24 are bypassed and the cryotrons 42 and 40 of the pairs associated with the lead 50 are bypassed. Similarly, for each other logic operation, one unique cryotron in each pair associated with a conductive path is bypassed to adapt the circuit for the particular logic operation. Since there are four pairs of logic cryotrons, and each pair is capable of two different conditions, a total of 16 different logic functions may be obtained from the universal circuit of the present invention. Furthermore, the symmetry of the logic circuit simplifies the control circuit therefor which reduces the cost and facilitates the operation thereof.

The logic circuit of FIG. 1 may be modified to combine logically more than two independent variable. Referring to FIG. 5, a three variable universal logic block is shown assembled on a supporting member. The three variable logic circuits (*x*, *y*, *z*) comprise a pair of two variable universal logic circuits of the type shown in FIG. 1 and additional logic circuitry for the third variable which selects one of the two variable circuits. For reasons of convenience, like elements to those shown in FIG. 1 will have like reference designations, the two-two variable logic circuits employed in FIG. 5 being distinguished from each other by the subscripts "*a*" and "*b*."

Cryotrons 80, 82, 84, 86, 88, 90, 92 and 94 included in the supporting member are responsive to a third binary input sigal (*z*) to select one of the two-two variable logic blocks. The cryotrons 84, 86, 92 and 94 are responsive to the "0" input of the third variable whereas the cryotrons 80, 82, 88 and 90 are responsive to the "1" input of the third variable. To permit the "1" input signal to select between the two-two variable logic blocks, the cryotrons 82 and 88 and 86 and 92 have their gate conductors in the "1" line of the input. The control leads of the former and the latter pairs, however, are in the "1" and "0" input lines, respectively, of the third variable. Similarly, to permit the "0' input variable to select between the two-two variable logic blocks, the cryotrons 80 and 90 and 84 and 94 have their gate conductors in the "0" input line. The control leads of the former and the latter pairs however, are in the "1" and "0" lines, respectively, of the third variable.

The circuit of FIG. 5 operates as an "AND" circuit when the logic cryotrons 20*a* and *b*, 30*a* and *b*, 42*a* and *b*, and 52*a* and 50*b* included therein are bypassed by the control cryotrons associated therewith. The procedure for bypassing the logic cryotrons is the same as that previously described in connection with the "AND" circuit of FIG. 2. The tabulation shown in FIG. 5*a* and labeled "AND" describes the outputs from the circuit for the various combination of input signals. Similarly, the tabulations shown in FIGS. 5*b* and *c* and labelled "OR" and "Exclusive OR" respectively, describe the outputs from the circuit for the various combination of input signals supplied to the circuit.

In the case of the "OR" circuit logic cryotrons 20*a*, 22*b*, 32*a* and *b*, 40*a* and *b*, and 50*a* and *b* are bypassed, whereas the "Exclusive OR" function shown in FIG. 5*c* is implemented by bypassing the same cryotrons, with the single change that 52*b* is bypassed instead of 50*b*. It will be noted that the cryotrons selected in the "*a*" two-two variable logic circuit provide the output for the first four rows of the truth tables shown in FIGS. 5*a*, *b* and *c* whereas the cryotrons selected in the "*b*" two-two variable logic circuit provide the output for the last four rows of the truth tables shown in FIGS. 5*a*, *b* and *c*.

Specific operation of each logic circuit is the same as the described for FIGS. 2, 3 and 4 except that the third variable directs the input signal to a selected two variable circuit to obtain the desired output. A brief description will now follow.

Assume for example that the circuit of FIGURE 5 is arranged for AND operation. As previously described, the cryotrons 22*a*, 22*b*, 32*a*, 32*b*, 40*a*, 40*b*, 50*a* and 52*b* appear in their respective superconductive paths. Additionally, the cryotrons 80, 82, 84, 86, 88, 90, 92, and 94 appear in their respective superconductive paths. The remaining cryotrons indicated in FIGURE 5 are shunted by their associated control cryotrons. Current sources 64 and 70 (see FIGURE 1) are operated to select the necessary cryotrons to perform the desired logic operation. The current sources 64 and 70 correspond to the X and Y inputs to the circuit of FIGURE 5. The X and Y inputs function as first and second independent variables supplied to the circuit. A third variable to the circuit is represented by a Z input. The Z input selects the circuit output as between the first and second varaibles.

FIGURE 5*a* discloses a truth table for the AND operation of the circuit shown in FIGURE 5. An output signal from the circuit is indicated at node 56 or 58 for various combinations of input signals appearing on lines 24, 28, 100, 102, 38 and 41. Assume for example, that the binary inputs supplied to the circuit are those appearing on line 4 of the truth table. The output at node 56, as a result, is a binary 0. The binary 1, 0 and 1 inputs for Y, Z and X variables, respectively, render the cyrotrons 86, 50*a* and 32*a* resistive. Accordingly, the signal appearing on the line 28 flows through cryotrons 82 and shunted cryotrons 42*a*, 52 and 90 to the node 58 to indicate a binary 0. Similarly, all other combinations of signal inputs to the circuit, except the last input, provide binary 0 outputs. The last input indicated in FIGURE 5*a*, provides a binary 1 output. The binary 1, 1 and 1 inputs for Y, Z and X variables, respectively, render cryotrons 82*a* and 52*b* resistive. The signal appearing on line 28, as a result, flows through cryotrons 86, 40*b* and shuntted cryotron 50*b* to the node 56 where a binary 1 output is provided.

Summarizing, briefly, the cryotrons 80 through 94 select between the *a* and *b* sections of the circuit of FIGURE 5 to provide an output. The selecting cryotrons are always in the circuit and are not bypassed as in the case of the cryotrons in the *a* and*b* section. Each section of the circuit may be considered as logically combining two independent binary values. Symbolically each section may be referred to as a "K" variable. Similarly, the selecting cryotrons employ another independent binary value as a "$K+1^{th}$" variable to select between the "K" variables.

Although the present invention has shown a two and three variable uiversal logic block, it is believed apparent that the circuit can be extended to handle any number of independent variables by employing cyrotrons corresponding to the cryotrons 80 through 94 as a $(K+1)$ variable to select one of two K variable circuits.

Besides cryogenic systems. the present invention has equal application to other switching devices for example, photocells of the type disclosed in U.S. Patent 2,952,792 cited above. Control points in such an embodiment could be shuntted or bypassed by turning on the light supplied to the point, the light driving the control point to a low resistance condition as explained in the cited Patent 2,952,792. The remaining cells perform the selected logic function as the light is turned on or off according to one of the input variables, the other input variable being supplied to the conductive paths typically printed circuit strips secured to the supporting member.

While the invention has been particularly shown and described with reference to preferred embodiments thereof, it will be understood by those skilled in the art that the foregoing and other changes in form and details may be made therein without departing from the spirit and scope of this invention.

What is claimed is:

1. A universal logic circuit comprising at least two sets of conductive paths, each conductive path of a set being connected to the other conductive path of the set through an associated interconductive path, a plurality of pairs of switching devices, one switching device in each pair being connected to a selected one of the conductive paths in a pair and the other switching device in a set being connected to the associated interconductive path of the selected conductive path, means for shunting one switching device in each pair of switching devices to arrange the circuit for a preselected logic operation, and means for supplying binary signals to the other switching devices in at least two of the switching pairs which perform the selected logic operation of the circuit.

2. The universal logic circuit defined in claim 1 wherein the means for supplying binary signals to the other switching device comprises a first signal source indicative of a binary "0" connected to one of the conductive paths in the set, and a second signal source indicative of a binary "1" connected to the other conductive path of the set.

3. The logic circuit, as defined in claim 7, arranged to perform an OR logic operation wherein the first, third, fourth and sixth switching devices are shunted.

4. The universal logic circuit, as defined in claim 7, arranged to perform an Exclusive-OR logic operation wherein the first, third, sixth and eighth switching devices are shunted.

5. A universal logic circuit for combining logically a plurality of independent binary variables designated "K" variables with one more binary variable designated the "$K+1$" variable comprising a first set of conductive paths, each conductive path of the set being connected to the other conductive path of the set through an associated interconductive path, a second set of conductive paths, each conductive path of the second set being connected to the other conductive path of the second set through an associated interconductive path, a plurality of pairs of switching devices associated with the first and second sets of conductive paths, means for shunting selected switching devices in each set of conductive paths to arrange the set of conductive paths for a desired logic function, each set of conductive paths and unshunted switching devices being adapted to combine logically binary signals corresponding to the "K" variables switching maens associated with each set of switching devices and conductive paths to respond to the binary "$K+1$" variable to select one of the sets of switching devices and conductive paths responsive to he "K" variables and provide an output corresponding to the logic function of the sets of conductive paths.

6. A universal logic circuit comprising at least two sets of superconductive paths, each superconductive path of a set being connected to the other superconductive path of the set through an associated interconnected superconductive path, a plurality of pairs of cryotrons, one cryotron in each pair being connected to a selected one of the superconductive paths in a set and the other cryotron in a set being connected to the associated interconnected superconductive path of the selected superconductive path, means including control cryotrons for shunting one cryotron in each pair of cryotrons to arrange the circuit for a preselected logic operation, and means for supplying first and second binary input signals to the unshunted cryotrons which perform the selected logic operation of the circuit.

7. A universal logic circuit comprising at least two sets of superconductive paths, each superconductive path of a set being connected to the other superconductive path of the set through an associated interconnecting superconductive path, a plurality of pairs of logic cryotrons, one logic cryotron in each pair connected in series with one of the superconductive paths in the set and the other logic cryotron in the pair being connected in series with the associated interconnected superconductive path of the selected superconductive path, control cryotron means connected in parallel with the logic cryotron included in the superconductive paths and the associated interconnected superconductive paths, selection means for driving all control cryotrons to a resistive condition, and means for supplying binary signals to those logic cryotrons connected in parallel with the control cryotrons and not in a resistive state.

8. A universal logic circuit comprising a first conductive path having an input and an output, a second conductive path having an input and an output, first and second series switching means included in the first conductive path, third and fourth series switching means included in the second conductive path, a first interconnecting conductive path connecting the input of the first conductive path to the output of the second conductive path, a second interconnecting conductive path connecting the input of the second conductive path to the output of the first conductive path, fifth and sixth series switching means included in the first interconnecting conductive path, seventh and eighth series switching means included in the second interconnecting conductive path, a first source of binary signals of one value connected to the first, third, fifth and seventh switching devices, a second source of binary signals of a second value connected to the remaining switching devices, a third source of binary signals of value corresponding to the first source connected to the input of the first conductive path and a fourth source of binary signals of value corresponding to the second source connected to the input of the second conductive path, and means for shunting all switching devices to arrange for a desired logic operation.

9. The logic circuit, as defined in claim 8, arranged to perform an AND operation wherein the first, second, fourth and seventh cryotrons are shunted.

10. First and second universal logic circuits, as defined in claim 8, and switching means responsive to fifth and sixth binary signal values corresponding to the first and second binary sources to select between the first and second circuits to provide an output which represents the logic combination of the signals supplied to the circuit.

References Cited by the Examiner

UNITED STATES PATENTS 3,004,705 10/61 Bremer -------------- 307—88.5

ARTHUR GAUSS, *Primary Examiner.*

HERMAN KARL SAALBACH, *Examiner.*